(12) United States Patent
Cho

(10) Patent No.: US 6,256,345 B1
(45) Date of Patent: Jul. 3, 2001

(54) METHOD AND APPARATUS FOR CODING INTERLACED SHAPE INFORMATION

(75) Inventor: Sung-Ryul Cho, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/099,531

(22) Filed: Jun. 18, 1998

(30) Foreign Application Priority Data

Jan. 31, 1998 (KR) .................................................. 98-2689

(51) Int. Cl.[7] .................................................. H04N 7/32
(52) U.S. Cl. ...................... 375/240.08; 348/699; 382/243
(58) Field of Search ........................ 375/240.08; 348/699; 382/243

(56) References Cited

U.S. PATENT DOCUMENTS

| | | | |
|---|---|---|---|
| 5,412,435 | 5/1995 | Nakajima | 348/699 |
| 5,929,915 | * 7/1999 | Cho | 375/240.13 |
| 6,043,846 | * 3/2000 | Shen | 348/699 |
| 6,049,631 | * 4/2000 | Kim | 382/239 |
| 6,081,554 | * 6/2000 | Lee et al. | 375/240.24 |

FOREIGN PATENT DOCUMENTS 0577365    1/1994    (EP) .............................. H04N/7/133

* cited by examiner

*Primary Examiner*—Howard Britton
(74) *Attorney, Agent, or Firm*—Pennie & Edmonds LLP

(57) ABSTRACT

A method for encoding a binary alpha block (BAB) type of a target block of an interlaced shape signal is provided. After no_update BAB_type which does not require supplemental encoded data is determined, either frame-basis or field-basis encoding is selected as an encoding_type based on a degree of correlation between the target block and its two field blocks. If field basis encoding is selected as encoding_type, it is determined whether or not said two field blocks correspond to one_field_no_update, which indicates at least one fields of said two field blocks require no supplemental data to be transmitted. If said two field blocks are decided as one_field_no_update, top or_bottom and BAB_type_field are detected to be encoded.

20 Claims, 5 Drawing Sheets

METHOD AND APPARATUS FOR CODING INTERLACED SHAPE INFORMATION

FIELD OF THE INVENTION

The present invention relates to a method and apparatus for coding interlaced shape information; and, more particularly, to a method and apparatus for effectively coding the interlaced shape information by modifying a coding mode of the interlaced shape information based on field_no_update estimation.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems.

One of such techniques for encoding video signals for a low bit-rate encoding system is the so-called object-oriented analysis-synthesis coding technique, wherein an input video image is divided into objects, and three sets of parameters for defining the motion, contour and pixel data of each object are processed through different encoding channels.

One example of such object-oriented coding scheme is the so-called MPEG (Moving Picture Experts Group) phase 4 (MPEG-4), which is designed to provide an audio-visual coding standard for allowing content-based interactivity, improved coding efficiency and/or universal accessibility in such applications as low-bit rate communication, interactive multimedia (e.g., games, interactive TV, etc.) and area surveillance.

According to MPEG-4, an input video image is divided into a plurality of video object planes (VOP's), which correspond to entities in a bitstream that a user can have an access to and manipulate. A VOP can be referred to as an object and represented by a bounding rectangle whose width and height may be the smallest multiples of 16 pixels (a macroblock size) surrounding each object so that the encoder may process the input video image on a VOP-by-VOP basis.

A VOP described in MPEG-4 includes shape information and texture information having luminance and chrominance data, wherein the shape information represented in binary shape signals is referred to as an alpha plane. The alpha plane is partitioned into a plurality of binary alpha blocks, wherein each binary alpha block (BAB) has conventionally 16×16 binary pixels. Each of the binary pixels is classified as either a background pixel or an object pixel, wherein the background pixel is located outside the object in the alpha plane and represented by a binary pixel value, e.g., 0, while the object pixel is positioned inside the object and represented by another binary pixel value, e.g., 255.

Each of the binary pixels in the BAB may be encoded by using a conventional bit-map-based shape coding method such as a context-based arithmetic encoding (CAE) technique and a motion estimation and compensation technique. For instance, in an intra-mode, all binary pixels of a current BAB are encoded by using an intra-CAE technique to thereby generate intra-CAE data, wherein a context value for a binary pixel of the BAB is calculated based on a predetermined number, e.g., 10 of binary pixels around the binary pixel in the BAB. In an inter-mode, all binary pixels of a current BAB are encoded by using an inter CAE technique to thereby generate inter-CAE data, wherein a context value of a binary pixel of the current BAB is calculated based on, e.g., 4 binary pixels surrounding the binary pixel in the current BAB and, e.g., 5 binary pixels in a reference BAB, e.g., within a bordered motion compensated BAB (see MPEG-4 Video Verification Model Version 7.0, International Organisation for Standardisation, Coding of Moving Pictures And Associated Audio Information, ISO/IEC JTC1/SC29/WG11 MPEG97/N1642, Bristol, April 1997, pp 28–30).

In the conventional binary shape encoding scheme, a BAB_type. for representing or characterizing an encoding type of a BAB is employed to improve the coding efficiency. For example, if all binary pixels within a BAB are object pixels, a BAB_type indicating that all the binary pixels within the BAB are object pixels is encoded and transmitted to a decoder of a receiving end in lieu of pixel data itself. Therefore, it is possible to enhance the coding efficiency by transmitting the BAB_type as the basic binary shape information for the BAB.

TABLE 1

| BAB_type | semantics |
| --- | --- |
| 0 | MVDs=0 and no_update |
| 1 | MVDs≠0 and no_update |
| 2 | transparent (all_0) |
| 3 | opaque (all_255) |
| 4 | intra_CAE |
| 5 | MVDs=0 and inter_CAE |
| 6 | MVDs≠0 and inter_CAE |

Referring to Table 1, there are illustrated 7 BAB_types for a BAB conventionally employed in the art, wherein a motion vector difference for shape (MVDs) is a difference between a motion vector for shape (MVs) and a motion vector predictor for shape (MVPS) of a BAB. (see MPEG-4 Video Verification Model Version 7.0, supra, pp 20–23).

In Table 1, a BAB_type '0' represents that the MVDs for a BAB is zero and the BAB corresponds to no_update, i.e., the BAB can be replaced by a most similar candidate BAB thereof, whereas a BAB_type '1' describes that the MVDs for a BAB has a value other than zero and the BAB can be replaced by a most similar candidate BAB thereof. A BAB of the BAB_type '0' can be represented by only the BAB_type itself while a BAB of the BAB_type '1' can be represented by both the BAB_type and the MVDs thereof.

A BAB_type '2' represents that a BAB is transparent, i.e., all the binary pixels within the BAB can be treated as background pixels, whereas a BAB_type '3' shows that a BAB is opaque, i.e., all the binary pixels within the BAB can be represented by object pixels. No other data than the BAB_type is required in representing the BAB of the BAB_type '2' or '3'.

A BAB_type '4' implies that all the binary pixels within a BAB have been encoded by intra-CAE; a BAB_type '5' denotes that the MVDs is defined as zero and all the binary pixels within a BAB have been encoded by inter-CAE; and a BAB_type '6' signifies that the MVDs has a value other than zero and all the binary pixels within a BAB have been encoded by inter-CAE. A BAB of the BAB_type '4' or '5' is represented by the BAB_type '4' or '5' followed by the intra-CAE or the inter-CAE data. A BAB of the BAB_type '6' requires the MVDs and the inter-CAE data in addition to the BAB_type itself.

Referring to FIG. 1, there is illustrated a conventional apparatus for adaptively encoding interlaced shape information of a VOP on a frame BAB basis and a field BAB basis, wherein a frame BAB includes M×N pixels therein and can be divided into a top and a bottom field BAB's, each having M/2×N pixels, M being an even positive integer and N being a positive integer. Typically, M and N have a value of 16 and the top and the bottom field BAB's are constituted by odd and even rows of pixels of the frame BAB, respectively. The interlaced shape information of a VOP is inputted to a frame detection circuit 10 on the frame BAB basis. The frame detection circuit 10 examines whether a current frame BAB having, e.g., 16×16 binary pixels can be treated as either transparent or opaque. Typically, if an error generated when the pixels within the current frame BAB are replaced with all 0's or all 255's is less than a predetermined threshold, the current frame BAB is determined as transparent or opaque. If the current frame BAB is determined as either transparent or opaque, the BAB_type '2' or '3' is provided to a transmitter(not shown) via a multiplexor (MUX) 60 and the encoding process of the current frame BAB is terminated.

If the current frame BAB is neither transparent nor opaque, the interlaced shape information of the current frame BAB is provided to an encoding_type decision circuit 20 and a switch 30. The encoding_type decision circuit 20 calculates frame and field correlations for the current frame BAB based on variations of the binary pixel values between two neighboring lines; determines whether a frame based or a field based coding is preferable based on the calculated frame and field correlations; assigns an encoding_type '0' to the current frame BAB if the frame correlation is equal to or greater than the field correlation and an encoding_type '1' if otherwise; and provides encoding_type '0' or '1' of the current frame BAB to the switch 30 and the MUX 60, wherein the encoding_type's '0' and '1' indicate that the current frame BAB is encoded on a frame and a field BAB bases, respectively. For example, the frame correlation can be calculated as a sum of binary pixel value differences between all possible two neighboring lines, i.e., a 1st and a 2nd lines, the 2nd and a 3rd lines and so on, of the current frame BAB; and the field correlation can be calculated as a sum of binary pixel value differences between all possible two neighboring odd lines, i.e., the 1st and the 3rd lines, the 3rd and a 5th lines and so on, and all possible two neighboring even lines, i.e., the 2nd and a 4th lines, the 4th and a 6th and so on. The smaller the sum of the binary pixel value differences is, the larger the degree of the correlation is.

The switch 30, responsive to the encoding_type, provides the interlaced shape information of the current frame BAB to the frame coding circuit 40 if the encoding_type corresponds to '0' and to the field coding circuit 50 if the encoding_type corresponds to '1'.

The frame coding circuit 40 selects one of the BAB_types '0', '1', '4', '5' and '6' as the BAB_type of the current frame BAB and encodes the current frame BAB as a frame basis according to the determined BAB_type. If the BAB_type is determined as '0', the output from the frame coding circuit 40 to the MUX 60 is the BAB_type only, whereas if the determined BAB_type is one of the BAB_types '1', '4', '5' and '6', the frame coding circuit 40 outputs to the MUX 60 the coded data of the current frame BAB on the frame basis (or the frame-coded data) along with the deter-mined BAB_type. The frame-coded data includes the encoded MVDs and/or the intra/inter-CAE data.

On the other hand, if the current frame BAB is provided from the switch 30 to the field coding circuit 50 in response to the encoding_type '1', the field coding circuit 50 divides the current frame BAB into two field BAB's, i.e., a top and a bottom field BAB's; selects one of the BAB_types '0', '1', '4', '5' and '6' as a BAB_type for both of the top and the bottom field BAB's; and encodes the two field BAB's separately on the field basis according to the determined BAB_type. It should be noted that the two field BAB's are separately encoded on the field basis even though only one BAB_type is assigned to the two field BAB's. The field BAB_type with field-coded data is provided to the MUX 60, wherein the field-coded data, if any, includes two encoded MVDs's and/or the intra/inter-CAE data of the two field BAB's. Details of the encoding scheme at the field coding circuit 50 will be described with reference to Table 2.

The MUX 60 multiplexes the BAB_type, the encoding_type and/or the frame-coded or the field-coded data to provide the encoded data for the current frame BAB to the transmitter for the transmission thereof. If the BAB_type is determined as '2' or '3' at the frame detection circuit 10, the encoded data is constituted by the BAB_type only. If the BAB_type is '0', the encoded data includes an encoding_type and the BAB_type. If the BAB_type is one of '1', '4', '5' and '6', the encoded data includes an encoding_type, the BAB_type and the frame-coded or the field-coded data depending on the encoding_type.

Referring to Table 2, there are illustrated BAB_types assigned for the two field BAB's at the field coding circuit 50. A top field BAB_type, i.e., a BAB_type of the top field BAB, 'Ti' and a bottom field BAB_type, i.e., a BAB_type of the bottom field BAB, 'Bi' correspond to a BAB_type 'i' defined in Table 1, i being an integer ranging from 0 to 6.

The field coding circuit 50 examines the top and bottom field BAB_types separately. If the two field BAB_types are determined to be the identical BAB_type '0', '1', '4', '5' or '6', the determined BAB_type is assigned to the two field BAB's. The BAB_type '2' or '3' is not assigned to the two field BAB's since the BAB_type '2' or '3' has been checked out on the frame basis at the frame detection circuit 10.

TABLE 2

| Bottom field BAB_type | Top field BAB_type | | | | | | |
|---|---|---|---|---|---|---|---|
| | T0 | T1 | T2 | T3 | T4 | T5 | T6 |
| B0 | 0 | 1 | | | | | |
| B1 | 1 | 1 | | | | | |
| B2 | | | X | | | 4, 5 or 6 | |
| B3 | | | | X | | | |
| B4 | | 4, 5 or 6 | | | 4 | | |
| B5 | | | | | | 5 | 6 |
| B6 | | | | | | 6 | 6 |

If one of the field BAB_types is '0' and the other is '1', the BAB_type '1' is assigned to the two field BAB's. If one of the two field BAB_types is '6' and the other is '5', the BAB_type '6' is assigned to the two field BAB's. For the remaining cases, both of the field BAB's are encoded according to the BAB_types '4', '5' and '6' and a BAB_type yielding a least number of encoded bits is assigned as the BAB_type of the two field BAB's.

In the conventional frame-field adaptive coding technique described above, if a BAB_type is '2' or '3', encoded data for the current frame BAB includes the BAB_type only. If the BAB_type is determined to be other than '2' or '3', the current frame BAB is represented by a BAB_type and an encoding_type together with frame-coded or field-coded data, if any. The adaptive coding technique has been evolved based on the fact that the correlation between fields are higher than that between frames and that two BAB_types of the top and bottom field BAB's are expected to be identical with each other. By performing the shape coding as described above, extra bits may be needed for some BAB's in representing the encoding_type and encoding the two field BAB's separately by using a single BAB_type. It should be noted that the optimum case would be to code two field BAB's separately based on their own field BAB_types which might be different from each other. Such occurrences, however, are expected to be rare since the probabilities of the two field BAB's sharing an identical BAB_type would be high in the interlaced shape information of a video signal. Those extra bits can be compensated with bits saved by assigning only one BAB_type to every two field BAB's and an enhanced coding efficiency can be achieved.

However, even though the aforementioned adaptive coding technique is capable of improving the coding efficiency, it still remains desirable to further reduce the volume of transmission data. For example, if a BAB_type is determined as '6' for two field BAB's having field BAB_types '0' and '6', there would be a considerable loss of bits because a field BAB having the BAB_type '0', which could have been encoded by the BAB_type '0' only, will require an MVDs and inter-CAE data for the representation thereof.

SUMMARY OF THE INVENTION

It is, therefore, a primary object of the present invention to provide a method and apparatus capable of further reducing the volume of transmission data by modifying a BAB type of interlaced shape information.

It is another object of the present invention to provide a method and apparatus for further reducing the volume of transmission data by selectively sorting out the BAB which can be specified by the BAB_type only.

In accordance with the present invention, there is provided a method for encoding a target block of an interlaced shape signal, wherein the interlaced shape signal includes a plurality of pictures, each picture being divided into a multiplicity of blocks of M×N pixels having one of a first and a second binary values, M and N being positive even integers, respectively, and the target block is encoded by either a frame-based coding to be encoded on an M×N pixel basis or a field-based coding to be encoded on an M/2×N pixels basis, the target block representing one of the blocks of a current picture to be encoded, comprising the steps of:

(a) determining whether or not the target block is encoded with only no_update BAB_type, wherein the no_update BAB_type represents that the target block is encoded only by the BAB_type itself, requiring no supplemental encoded data for the target block;

(b) if the target block is not encoded with the no_update BAB_type, selecting either the frame-based or the field-based encoding_type as an encoding_type based on a degree of correlation between the target block and its two field blocks, wherein said two field blocks contain every odd row and every even row of the target block, respectively, each field block having M/2×N pixels, and the encoding_type indicates which of a frame-based coding discipline and a field-based coding discipline is used to encode the target block;

(c) if the field-based coding is selected in step (b), deciding whether or not the two field blocks correspond to one_field_no_update, wherein said one_field_ no_update represents that at least one of the two field blocks is replaced with a most similar candidate field block;

(d) if the two field blocks are decided as a BAB_type '1' of said one_field_no_update, finding top_or_ bottom and BAB_type_field, wherein said top_or_ bottom indicates which of the two field blocks is replaced with the most similar candidate field block and the BAB_type_field represents a coding condition of the other field block that is not indicated by the top_ or_bottom; and (e) multiplexing the non_data BAB_type, the encoding_type, the BAB_type, the top_or_bottom and/or the BAB_type_field.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
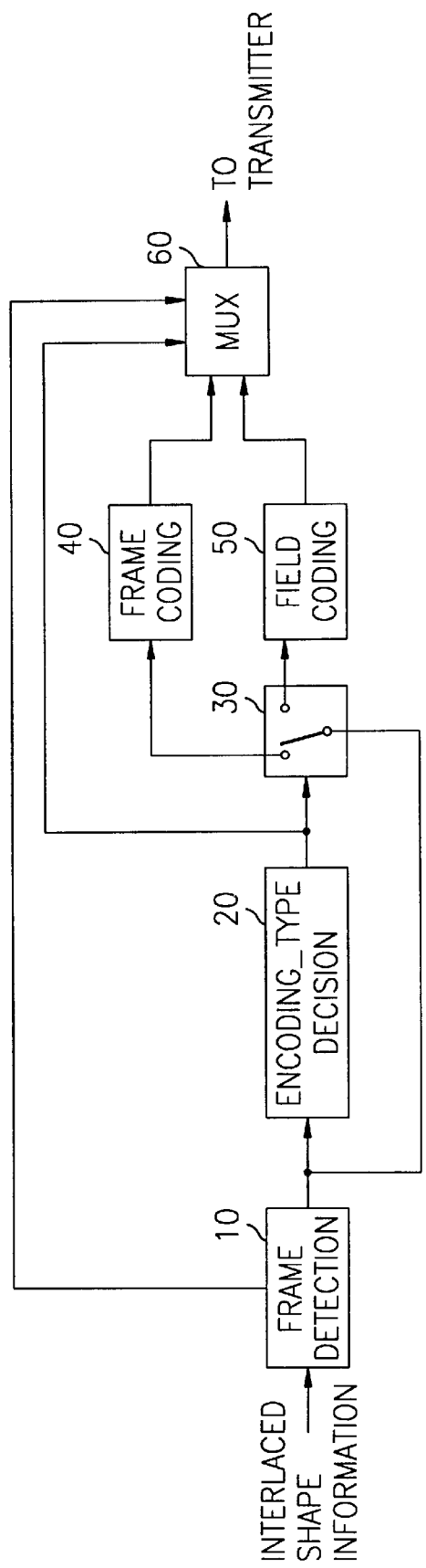
FIG. 1 illustrates a conventional apparatus for encoding the interlaced shape information on a binary alpha block (BAB) basis.
Figure 2:
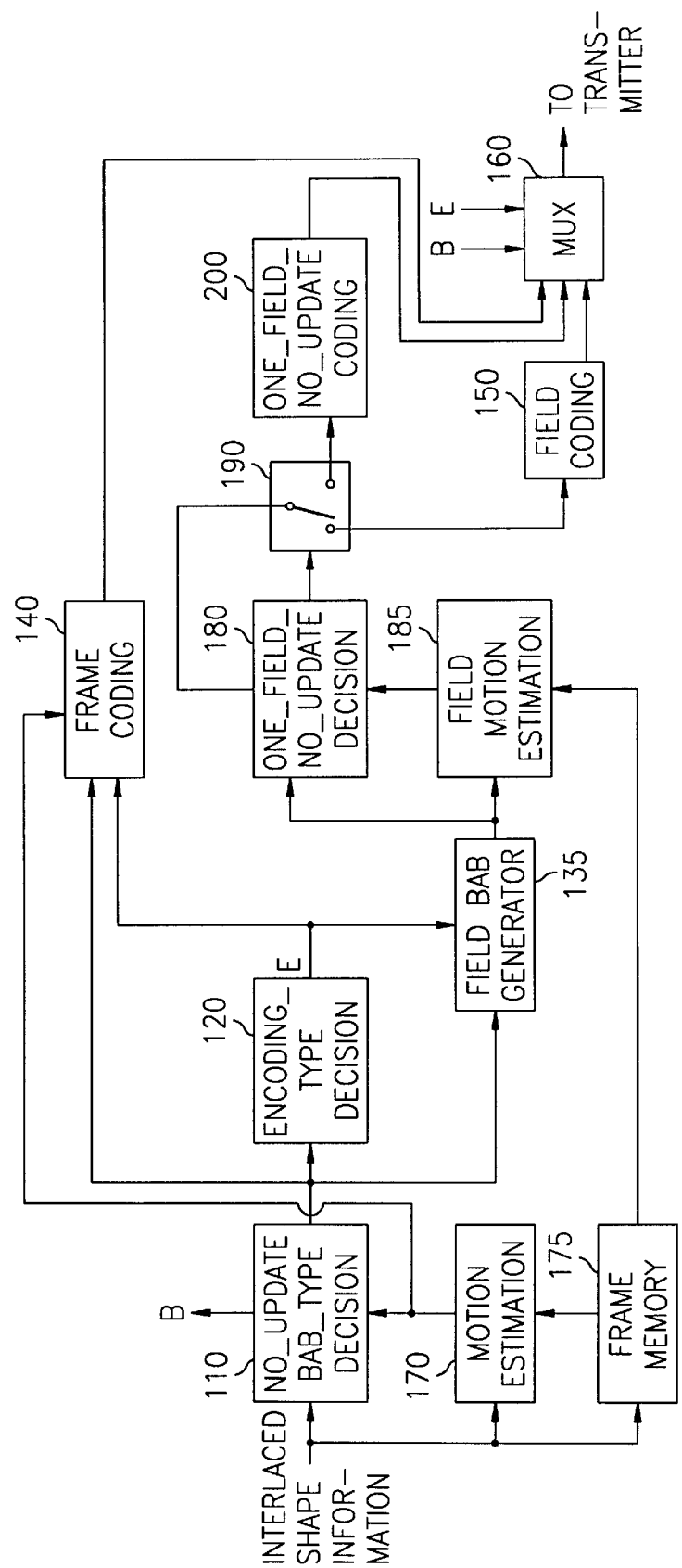
FIG. 2 shows a schematic block diagram of an apparatus for encoding the interlaced shape information on a BAB basis in accordance with the preferred embodiment of the present invention.

Referring to FIG. 2, there is illustrated an apparatus for adaptively encoding interlaced shape information on a current VOP in accordance with the preferred embodiment of the present invention, the interlaced shape information being of the form of a binary alpha plane. The binary alpha plane is partitioned into a plurality of frame BAB's and bordered frame BAB's, which are provided one after another to a no_update BAB_type decision circuit 110, a motion estimation circuit 170 and a frame memory 175. A bordered frame BAB includes a frame BAB and border pixels neighboring the frame BAB, wherein the border pixels represent top and bottom border pixels at a top and a bottom border of width equal to, e.g., 4 pixels above and below the frame BAB, respectively, and left and right border pixels at a left and a right border of width equal to, e.g., 2 pixels at the left and the right of the frame BAB, respectively. The right border pixels of the border frame BAB may be padded based on the rightmost pixels of the frame BAB. The border pixels can be used to make up the context of a pixel in the frame BAB for both the intra-CAE and the inter-CAE.

The motion estimation circuit 170 performs motion estimation on a current frame BAB included in a current bordered frame BAB on a frame basis with respect to a plurality of candidate frame BAB's within a binary alpha plane of a reference, e.g., a previous frame, the previous frame being provided from the frame memory 175; selects a predicted frame BAB of the current frame BAB among the candidate frame BAB's, the predicted frame BAB being a most similar candidate frame BAB; computes a motion vector difference for shape (MVDs) of the current frame BAB; and provides the MVDs and a predicted bordered frame BAB retrieved from the frame memory 175 to the no_update BAB_type decision circuit 110 and a frame coding circuit 140, wherein the predicted bordered frame BAB includes the predicted frame BAB and bordered pixels of width equal to 1 around the predicted frame BAB and the border pixels in the predicted bordered frame can be used to make up the context of a pixel in the current frame BAB for the inter_CAE. The MVDs represents a difference between a motion vector for shape (MVs) and a motion vector predictor for shape (MVPs) of the current frame BAB, the MVs representing a displacement between the current frame BAB and the predicted frame BAB.

The no_update BAB_type decision circuit 110 examines whether or not a BAB_type of the current frame BAB corresponds to '0', '2' or '3'. If the examination result is affirmative, the BAB_type '0', '2' or '3' is provided to a multiplexor (MUX) 160 as a no_update BAB_type B, wherein the BAB_type '0', '2' or '3' represents that the current frame BAB can be encoded by only the BAB_type itself and, therefore, requires no supplemental data.

Specifically, the current frame BAB can be partitioned into 16 number of subblocks of 4×4 pixels. If all errors between all subblocks of the BAB and an all_0 subblock are smaller than or equal to a predetermined threshold, all the pixels of the BAB can be represented by background pixels with a pixel value '0' and BAB_type '2' indicating "all_0" is allotted, wherein the all_0 subblock is a subblock whose binary pixel values are all_0. Similarly, if all the binary pixels of the BAB can be changed to object pixels with a pixel value '255', BAB_type '3' indicating "all_255" is allotted. If the predetermined threshold is set to '0', "all_0" and "all_255" represent that every pixel of the current frame BAB is the background pixel and the object pixel, respectively. Also, if the MVDs is zero and all errors between all subblocks of the current frame BAB and their corresponding subblocks of the predicted frame BAB are smaller than or equal to the predetermined threshold, respectively, so that the current frame BAB can be replaced with the predicted frame BAB fed from the motion estimation circuit 170, the BAB_type '0' indicating "MVDs=0 and no_update" is allotted.

If the no_update BAB_type B is generated, no more BAB_type decision procedure will be going on and, if otherwise, the current bordered frame BAB is provided to an encoding_type decision circuit 120, the frame coding circuit 140 and a field BAB generator 135. The encoding_type decision circuit 120 calculates frame and field correlations for the current frame BAB based on variations of the binary pixel values between two neighboring lines; determines which of a frame based and a field based coding is preferable based on the calculated frame and field correlations; assigns an encoding_type E '0' to the current frame BAB if the frame correlation is equal to or greater than the field correlation and an encoding_type E '1' if otherwise; and provides encoding_type E '0' or '1' of the current frame BAB to the frame coding circuit 140, the field BAB generator 135 and the MUX 160, wherein the encoding_type E '0' and '1' indicates that the current frame BAB is encoded on a frame and a field BAB bases, respectively.

The frame coding circuit 140 is activated when the encoding_type E is '0' and determines one of the BAB_type '1', '4', '5' and '6' as a BAB_type of the current frame BAB based on the current bordered frame BAB from the encoding_type decision circuit 120 and the MVDs and the predicted bordered frame BAB from the motion estimation circuit 170. The frame coding circuit 140 provides the MUX 160 with the determined BAB_type and frame-coded data, the frame-coded data representing coded data of the current frame BAB based on the frame basis. The frame-coded data includes encoded MVDs if the BAB_type is '1'; intra-CAE data if the BAB_type is '4'; inter-CAE data if the BAB_type is '5'; and encoded MVDs and inter-CAE data if the BAB_type is '6'.

The field BAB generator 135 is activated if the encoding_type E corresponding to '1' is fed thereto. The field BAB generator 135 divides the current bordered frame BAB into two bordered field BAB's, i.e., a top bordered and a bottom bordered field BAB's. The top bordered field BAB preferably contains every odd row of the current bordered frame BAB and includes a top field BAB and border pixels thereof, the top field BAB being made of odd rows of the current frame BAB. The bottom bordered field BAB contains every even row of the current bordered frame BAB and includes a bottom field BAB and border pixels thereof, the bottom field BAB being made of even rows of the current frame BAB. The field BAB generator 135 provides the two bordered field BAB's to a one_field_no_update decision circuit 180 and a field motion estimation circuit 185.

The field motion estimation circuit 185 performs the motion estimation on the top and the bottom field BAB's on the field basis. To be more specific, the field motion estimation circuit 185 retrieves a binary alpha plane of a reference, e.g., previous, frame from the frame memory 175 and divides the retrieved alpha plane into a top and a bottom alpha planes, the top and the bottom alpha planes being constituted by odd and even rows of the retrieved alpha plane, respectively. In motion estimating the top field BAB, a top field MVPs is determined first. The top field MVPs can be one of MVs's of previously processed field BAB's or frame BAB's neighboring to the top field BAB. Thereafter, a multiplicity of candidate field BAB's are determined based on the top field MVPs in the top and the bottom alpha planes, the candidate field BAB's having an identical size as that of a field BAB. Then, the top field BAB is motion estimated with respect to the candidate field BAB's to determine one of the candidate field BAB's as a predicted top field BAB. After determining the predicted top field BAB, an MVDs for the top field BAB (top field MVDs) is calculated, wherein the top field MVDs is given by the difference between the top field MVPs and a top field MVs, the top field MVs representing the displacement between the top field BAB and the predicted top field BAB. Outputs for the top field BAB from the field motion estimation circuit 185 are a top field flag representing the top or the bottom alpha plane at which the predicted top field BAB is located, the top field MVDs and a predicted top bordered field BAB retrieved from the frame memory 175, wherein the predicted top bordered field BAB includes the predicted top field BAB and border pixels of a width equal to 1 around the predicted top field BAB. The bottom field BAB is motion estimated in a similar manner described above and a bottom field flag, a bottom field MVDs and a predicted bottom bordered field BAB including a predicted bottom field BAB and its corresponding bordered pixels are provided for the bottom field BAB. Outputs of the field motion estimation circuit 185 are fed to the one_field_no_update decision circuit 180. For the details of the motion estimation of a frame BAB and a field BAB, please refer to, e.g., MPEG-4 supra. It should be noted that the motion estimation can be performed in a manner different from the one described above.

The one_field_no_update decision circuit 180 decides whether or not one of the two field BAB's corresponds to the BAB_type '0' or '1'; and provides a switching signal and field data to a switch 190, wherein the switching signal indicates whether or not at least one of the two field BAB's can be replaced with its corresponding predicted field BAB irrespective of a value of the corresponding MVDs and the field data includes the top and the bottom bordered field BAB's from the field BAB generator 135 and outputs from the field motion estimation circuit 185. Specifically, the one_field_no_update decision circuit 180 checks whether or not an error between the top or the bottom field BAB and its corresponding predicted field BAB is smaller than or equal to a predetermined threshold so that the top or the bottom field BAB can be replaced with the corresponding predicted field BAB.

At the switch 190, the field data for the two field BAB's is switched based on the switching signal. Specifically, if the switching signal represents that the top or the bottom field BAB can be replaced with its corresponding predicted field BAB, the field data is provided to an one_field_no_update coding circuit 200. Otherwise, the field data is provided to a field coding circuit 150.

Figure 3:
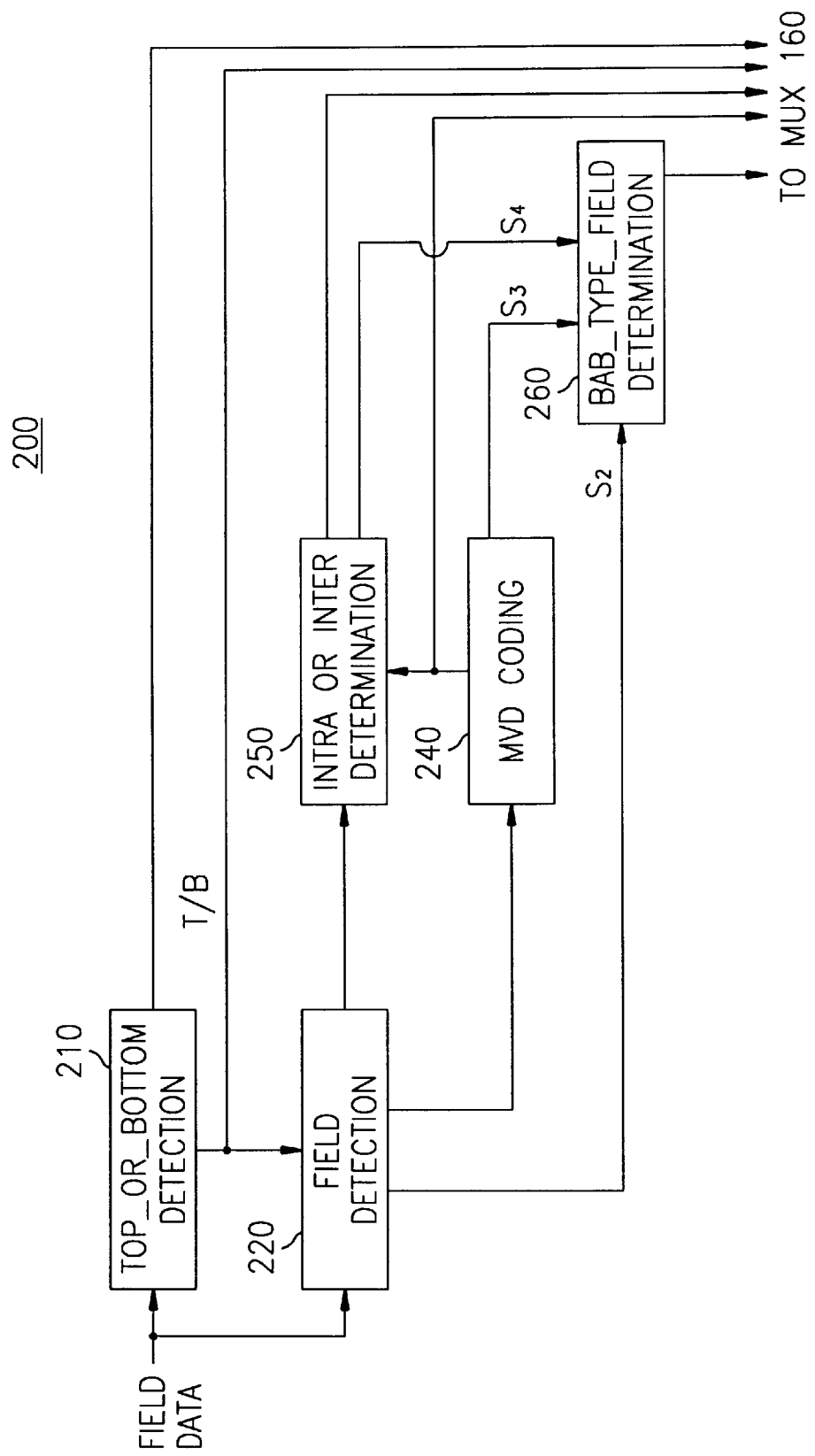
FIG. 3 represents a detailed block diagram of a one_ field_no_update coding circuit shown in FIG. 2.

The one_field_no_update coding circuit 200 encodes the two field BAB's based on an inventive scheme of the present invention. Referring to FIG. 3, there is illustrated a detailed block diagram of the one_field_no_update coding circuit 200 in accordance with the preferred embodiment of the invention, wherein the field data is provided to a top_or_bottom detection circuit 210 and a field detection circuit 220.

First of all, the top_or_bottom detection circuit 210 determines if a field BAB corresponds to the BAB_type '0' or '1' as a field_no_update and provides a top_or_bottom (T/B) '0' or '1', to the field detection circuit 220 and the MUX 160, wherein the T/B '0' and '1' indicate the bottom and the top field BAB's correspond to the field_no_update, respectively. If both the two field BAB's correspond to the BAB_type '0' or '1', the top field BAB may be preferable referred to as the field_no_update. The top_or_bottom detection circuit 210 encodes the MVDs of the determined field_no_update even if the value thereof is zero and transfers the encoded MVDs to the MUX 160. It should be noted that even if a BAB determined as a field_no_update is of the BAB_type '0', the BAB_type '1' is assigned thereto and the MVDs thereof having the value of zero is also encoded i:n accordance with the present invention, whereas a BAB of the BAB_type '0' is represented by the BAB_type only without encoding the MVDs thereof in the conventional coding scheme.

The field detection circuit 220 finds the other field BAB which is not indicated by the top_or_bottom and determines whether a BAB_type_field, i.e., BAB_type of the other field BAB, corresponds to "no_update" (i.e., BAB_type '0' or '1'), "all_0" (i.e., BAB_type '2') or "all_255" (i.e., BAB_type '3') based on the field data. If the BAB_type_field is one of "no_update", "all_0" and "all_255", an indication signal $S_2$, which indicates the other field BAB is defined as "no_update", "all_0" or "all_255", is provided therefrom to a BAB_type_field determination circuit 260. The field detection circuit 220 also provides a MVDs_field, i.e., the MVDs of the other field BAB, to an MVD coding circuit 240 if the other field BAB corresponds to "no_update". If the BAB_type_field is neither of "no_update", "all_0" and "all_255", the MVDs_field is provided to the MVD coding circuit 240 and the remaining field data, i.e., a bordered field BAB and predicted bordered field BAB, of the other field BAB is fetched to an intra or inter determination circuit 250.

The MVD coding circuit 240 provides the BAB_type_field determination circuit 260 with an MVD signal $S_3$ indicating whether or not the MVDs is equal to '0' and encodes the MVDs_field to provide the encoded MVDs_field to the intra or inter determination circuit 250 and the MUX 160. The MVDs_field is preferably not encoded if the value thereof is zero.

The intra or inter determination circuit 250 performs the intra-CAE and the inter-CAE on the other field BAB based on the remaining field data and the encoded MVDs_field; compares the number of bits of the intra-CAE data with that of the encoded MVDs_field and the inter-CAE data; and selects data having a not greater bit number as a BAC(binary arithmetic code)_field. The intra or inter determination circuit 250 provides an intra/inter signal $S_4$, indicating that the other field BAB is encoded by either the intra-CAE or the inter-CAE, to the BAB_type_field determination circuit 260 and the BAC_field to the MUX 160.

The BAB_type_field determination circuit 260 determines a BAB_type of the other field BAB, i.e., a BAB_type_field, '0', '1', '2', '3', '4', '5' or '6' based on the signals $S_2$, $S_3$ and $S_4$ and provides the BAB_type_field to the MUX 160. Specifically, if the $S_2$ indicates that the other field BAB corresponds to "all_0" or "all_255", the BAB_type_field is determined to be '2' or '3'. If the $S_2$ represents that the other field BAB corresponds to "no_update" and the $S_3$ represents that "MVDs_field=0", the BAB_type_field is decided as '0'. If the $S_2$ and $S_3$ show that the other field BAB and the MVDs_field correspond to "no_update" and a non-zero value, respectively, the BAB_type_field is set to be '1'. If the $S_2$ is not fed and the $S_4$ denotes that the BAC_field is the intra-CAE data, the BAB_type_field is determined as '4'. If the $S_2$ is not fed while the $S_4$ represents that the BAC_field is the inter_CAE data and the MVDs_field is found to have zero by the $S_3$, the BAB_type_field is set as '5'. Finally, if the $S_4$ corresponds to the inter-CAE data and the $S_3$ corresponds to a non-zero valued MVDs_field, the BAB_type_field is decided as '6'

Referring back to FIG. 2, if none of the two field BAB's correspond to the BAB_type '0' or '1', the field coding circuit 150 determines one of the BAB_types '4', '5' and '6' as a BAB_type for both of the two field BAB's based on the field data provided from the one_field_no_update decision circuit 180 via the switch 190. In determining the BAB_type for the two field BAB's, a conventional bit number comparison scheme can be used, wherein the number of bits required in representing the two field BAB's by the intra-CAE scheme (i.e., the number of bits for representing the BAB_type '4' and the intra-CAE data for the two field BAB's) and that required in representing the two field BAB's by the inter-CAE technique(i.e., the number of bits for representing the BAB_type '5' or '6', the inter-CAE data for the two field BAB's, and the encoded MVDs for the two field BAB's if an MVDs of one of the two field BAB's is non-zero) are compared with each other; and a BAB_type corresponding to a not greater number of bits is selected as the BAB_type for the two field BAB's. Please, note that BAB_type '4' or '5' is selected as the BAB_type for the two field BAB's if both the two MVDs's are zero-valued and the BAB_type '4' or '6' is determined as the BAB_type of the two field BAB's if at least one of the two MVDs's' is non-zero value. That is, if one MVDs is zero and the other is non-zero valued, and the BAB_type is determined as '6', both the MVDs's are encoded. The field coding circuit 150 provides the encoded BAB_type '4', '5' or '6', and intra_CAE or inter_CAE data as a BAC to the MUX 160. The encoded MVDs's are fed from the field coding circuit 150 to the MUX 160 if the BAB_type is '6'.

The MUX 160 multiplexes the no_update BAB_type B, the encoding type E and the encoded data from the frame coding circuit 140, the one_field_no_update coding circuit 200 and the field coding circuit 150 to provide multiplexed data for the current frame BAB to a transmitter(not shown) for transmitting thereof. Details of the multiplexing scheme will be described with reference to the bit stream syntax shown in Table 3.

Referring to Table 3, there is shown an exemplarily bit stream syntax in accordance with the present invention.

TABLE 3

```
MB_interlaced_shape_coding() {
  BAB_type
  if((BAB_type==1)||(BAB_type>=4))
    encoding_type
  if((BAB_type==1)||(BAB_type==6)){
    MVDs_x
    MVDs_y
  }
  if((BAB_type>=4)&&(encoding_type==0))
    BAC
  if(encoding_type==1)
    Interlaced_shape_information()
}//End of MB_binary_shape_coding
Interlaced_shape_information(){
  if(BAB_type==6){
    MVDs_x_bottom
    MVDs_y_bottom
  }
  if(BAB_type)>=4)
    BAC_field
  if(BAB_type==1){
    top_or_bottom
    BAB_type_field
    if((BAB_type_field==1)||(BAB_type_field==6)){
      MVDs_x_field
      MVDs_y_field
    }
    if((BAB_type_field>=4)
      BAC_field
  }
}//End of Interlaced_shape_information()
```

The 1 bit encoding_type '0' indicates that the two field BAB's are encoded as one unit, i.e., on a frame basis while the encoding_type '1' indicates that the two field BAB's are encoded separately, i.e., on a field basis.

The BAB_type is a variable length code, e.g., between 1 and 6 bits. If the BAB_type corresponds to '0', '2' or '3' which implies that the current frame BAB is encoded on the frame basis, no encoding_type follows. If the BAB_type is one of '1', '4', '5' and '6', the encoding_type follows thereafter.

The 1 bit top_or_bottom '0' indicates the bottom field BAB corresponds to the field no_update while the top_or_bottom '1' indicate the top field BAB corresponds to the field no_update.

The BAB_type field '0', '1', '2', '3', '4', '5' or '6' represents the BAB_type of the other field BAB which is not indicated by the top_or_bottom.

TABLE 4

| | encoding_type = '1' | | |
|---|---|---|---|
| | | BAB_type = '1' | |
| | BAB_type = '6' | top_or_bottom = '1' | top_or_bottom = '0' |
| MVDs_x / MVDs_y | horizontal / vertical component for the top field BAB | horizontal / vertical component for the top field BAB | horizontal / vertical component for the bottom field BAB |

The MVDs_x/MVDs_y with the encoding_type '0' represents horizontal/vertical component of the MVDs for the frame BAB while the MVDs_x/MVDS_y with the encoding_type '1' represents horizontal/vertical component of the field MVDs for a field BAB as shown in Table 4.

The BAC is the frame-coded data generated by intra CAE or inter CAE if the encoding_type is '0'.

The BAC_field is field-coded data for the two field BAB's generated by intra-CAE or inter-CAE if the BAB_type is '4', '5' or '6' and the encoding_type is '1'. The BAB_field is field-coded data for the other field BAB generated by intra_CAE or inter-CAE if the BAB_type is '1', the encoding_type is '1' and the BAB_type_field is '4', '5' or '6'.

The MVDs_x_bottom/MVDs_y_bottom represents the horizontal/vertical component of the field MVDs for the bottom field BAB. The MVDs_x_field/MVDs_y_field represents the horizontal/vertical component of the field MVDs for the other field BAB which is not indicated by the top_or_bottom, wherein, if the top_or_bottom is '1', the other field BAB indicates the bottom field BAB of the BAB, while, if the top_or_bottom is '0', the other field BAB indicates the top field BAB thereof.

Referring to Table 5, there are exemplarily illustrated 4 number of BAB_types assigned to the two field BAB's in case the current field BAB is encoded on a field-by-field basis, wherein a top and a bottom field BAB_types 'Ti' and 'Bi' correspond to a conventional BAB_type 'i', i being an integer ranging from 0 to 6. There are no BAB_type '0', '2' and '3' assigned to both the field BAB's, because "MVDs=0 and no_update", "all_0" and "all_255" have already been checked out on the frame basis in the no_update BAB_type decision circuit 110.

TABLE 5

| | Top field BAB_type | | | | | | |
|---|---|---|---|---|---|---|---|
| Bottom field BAB_type | T0 | T1 | T2 | T3 | T4 | T5 | T6 |
| B0 | X | 1 | 1 | 1 | 1 | 1 | 1 |
| B1 | 1 | 1 | 1 | 1 | 1 | 1 | 1 |
| B2 | 1 | 1 | X | | 4, 5 or 6 | | |
| B3 | 1 | 1 | | X | | | |
| B4 | 1 | 1 | | | 4 | | |
| B5 | 1 | 1 | | | | 5 | 6 |
| B6 | 1 | 1 | 4, 5 or 6 | | | 6 | 6 |

Figure 4A:
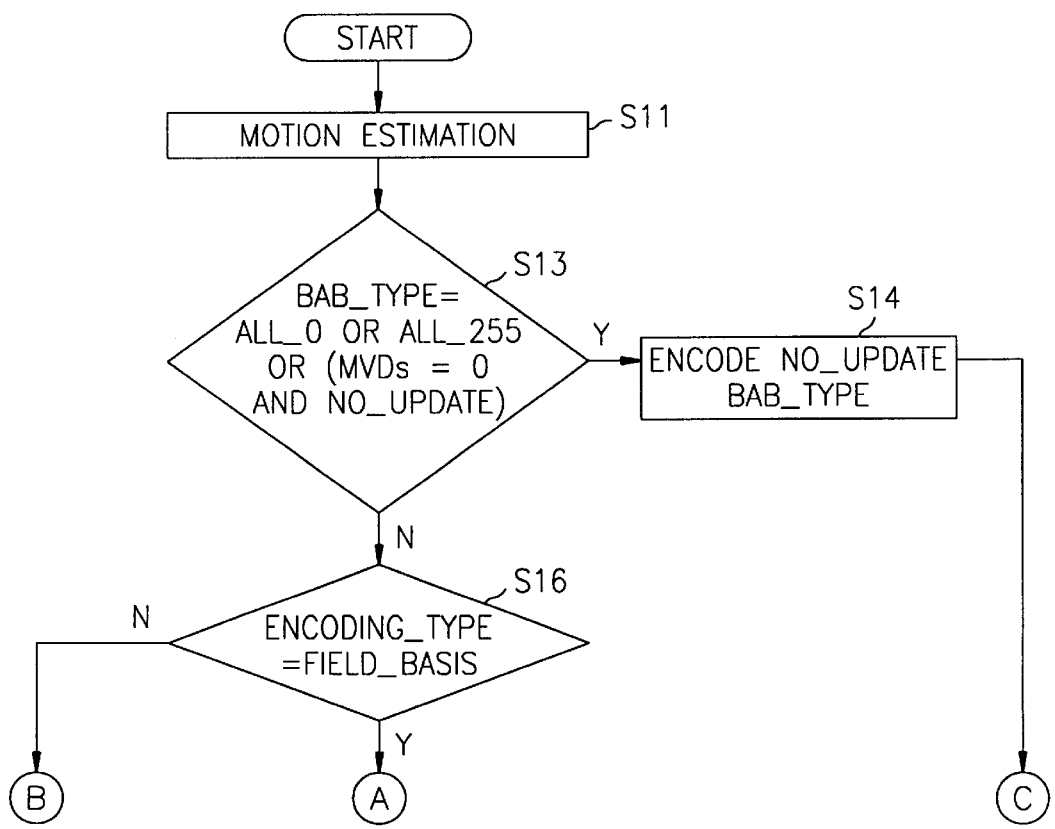
FIGS. 4A and 4B present a flow chart regarding the BAB_type encoding algorithm for a BAB in accordance with the present invention.
Figure 4B:
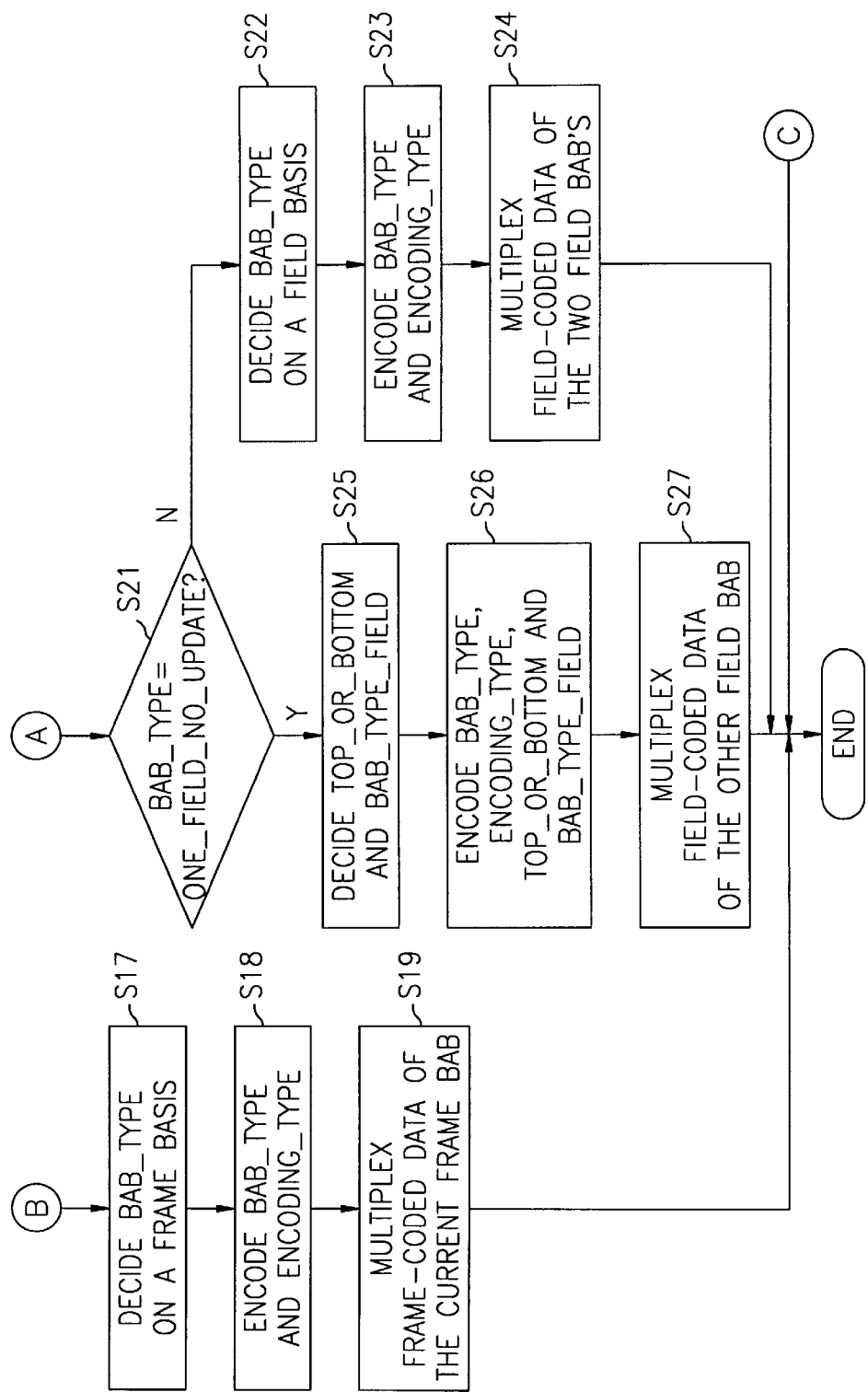

Referring to FIGS. 4A and 4B, there is illustrated a flow chart regarding the BAB_type encoding algorithm of the interlaced shape information on a BAB basis in accordance with the present invention.

At step S11, by performing the motion estimation on a current frame BAB in a current bordered frame BAB on a frame basis with respect to a plurality of candidate frame BAB's within a binary alpha plane of a reference, e.g., a previous frame, a predicted frame BAB of the current frame BAB is selected and the MVDs of the current frame BAB is calculated.

At step S13, the no_update BAB_type is decided based on the current frame BAB. To be more specific, it is examined that all the pixels within the current BAB can be replaced with all 0's or all_255's so that only the BAB_type '2' or '3' may represent the BAB itself and, if not, it is further determined that the MVDs of the current frame BAB is zero and the BAB is replaced with a predicted frame BAB, e.g., the most similar candidate BAB so that only the BAB_type '0' can represent the current frame BAB itself. If the current frame BAB is represented by the no_update BAB_type '2', '3' or '0', i.e., "all_0", "all_255" or "MVDs=0 and no_update", at step S14, the no_update BAB_type for the current frame BAB is encoded and no further encoding algorithm will go on.

If otherwise, at step S16, the frame and the field correlations of the current frame BAB are calculated based on the variations of the binary pixel values of all the two neighboring lines thereof and all the two neighboring odd and even lines thereof, respectively, so that it is determined whether or not the frame correlation of the current frame BAB is greater than the field correlation thereof. If the frame based coding is determined to be preferable to the field based coding so that the encoding_type is "frame_basis", i.e., '0', at step S17, one of the BAB_types '1', '4', '5' and '6' is determined as a BAB_type of the current frame BAB, wherein the BAB_types '1', '4', '5' and '6' represent that the current frame BAB is preferably coded with "MVDs≠0 and no_update", "intra_CAE", "MVDs=0 and inter_CAE" and "MVDs≠0 and inter_CAE", respectively. At step S18, the BAB_type '1', '4', '5' or '6' and the encoding_type '0' are encoded; and, then at step S19, frame-coded data of the current frame BAB is multiplexed according to the BAB_type '1', '4', '5' and '6' and the process ends, wherein the frame-coded data includes the encoded MVDs and/or the BAC, i.e., the intra/inter CAE data generated by the intra/inter CAE technique.

In the meantime, if it is found out at step S$_{16}$ that the field based coding is preferable to the frame based coding in response to the encoding_type '1', then at step S21, it is determined whether or not the two field BAB's of the current frame BAB correspond to the one_field_no_update. In other words, it is examined if a top or a bottom field BAB can be replaced with a corresponding predicted field BAB. If the two field BAB's do not match with the one_field_no_update, then at step S22, the BAB_type '4', '5' or '6' of the two field BAB's is decided based on the bit number comparison scheme, which compares the number of the bits required in representing the two field BAB's by the intra-CAE scheme with that required in representing the two field BAB's by the inter-CAE scheme; at step S23, the field BAB_type '4', '5', or '6' and the encoding_type '1' indicating the field based coding are encoded; and, at step S24, the two field BAB's are encoded one after the other by the intra/inter-CAE discipline therefor so that the field-coded data including two MVDs for the two field BAB's, if any, and/or the intra/inter CAE data is generated and then the process ends.

If the two field BAB's match with the one_field_no_update at step S21 so that the two field BAB's correspond to the field BAB_type '1', it is determined at step S25 that either the top or the bottom field BAB corresponds to the field_no_update so that the top_or_bottom T/B '0' or '1' may be generated and, then, the BAB_type_field, i.e., BAB_type of the other field BAB, which is not indicated by the top_or_bottom, is decided, wherein the BAB_type_field '0', '1', '2', '3', '4', '5' and '6' represent that the other field BAB corresponding correspond to "MVDs_field=0 and field_no_update", "MVDs_field≠0 and field_no_update", "all_0", "all_255", "intra_CAE", "MVDs-field=0 and inter_CAE" and "MVDs_field≠0 and inter_CAE', respectively. At step S26, the BAB_type '1', the encoding_type '1', the top_or_bottom '0' or '1' and the BAB_type_field '0', '1', '2', '3', '4', '5', or '6' are sequentially encoded. At step S27, field-coded data of the other field BAB is multiplexed and then the process ends, wherein the field-coded data of the other field BAB includes the MVDs_field, if any, and/or the intra/inter CAE data of the other field BAB.

While the present invention has been described with respect to certain preferred embodiments only, other modifications and variations may be made without departing from the spirit and scope of the present invention as set forth in the following claims.

What is claimed is:

1. A method for encoding a target block of an interlaced shape signal, wherein the interlaced shape signal includes a plurality of pictures, each picture being divided into a multiplicity of blocks of M×N pixels having one of a first and a second binary values, M and N being positive even integers, respectively, and the target block is encoded by either a frame-based coding to be encoded on an M×N pixel basis or a field-based coding to be encoded on an M/2×N pixels basis, the target block representing one of the blocks of a current picture to be encoded, comprising the steps of:

(a) determining whether or not the target block is encoded with only no_update binary alpha block type (BAB_type), wherein the no_update BAB_type represents that the target block is encoded only by the BAB_type itself, requiring no supplemental encoded data for the target block;

(b) if the target block is not encoded with the no_update BAB_type, selecting either the frame-based or the field-based encoding_type as an encoding_type based on a degree of correlation between the target block and its two field blocks, wherein said two field blocks contain every odd row and every even row of the target block, respectively, each field block having M/2×N pixels, and the encoding_type indicates which of a frame-based coding discipline and a field-based coding discipline is used to encode the target block;

(c) if the field-based coding is selected in step (b), deciding whether or not the two field blocks correspond to one_field_no_update, wherein said one_field_no_update represents that at least one of the two field blocks is replaced with a most similar candidate field block;

(d) if the two field blocks are decided as a BAB_type '1' of said one_field_no_update, finding top_or_bottom and BAB_type_field, wherein said top_or_bottom indicates which of the two field blocks is replaced with the most similar candidate field block and the BAB_type_field represents a coding condition of the other field block that is not indicated by the top_or_bottom; and (e) multiplexing the non_data BAB_type, the encoding_type, the BAB_type, the top_or_bottom and/or the BAB_type_field.

2. The method as recited in claim 1, wherein the step (c) includes the steps of:

(c1) field based motion estimating each of said two field blocks with reference to one or more reference pictures of the current picture, to thereby generate a most similar candidate field block thereof;

(c2) calculating a field error between said each field block and the most similar candidate field block to compare the field error of said each field block with another predetermined threshold;

(c3) if the field error of said each field block is not greater than the predetermined threshold, deciding said each field block to be field_no_update, wherein the field_no_update represents that said each field block is replaced with the most similar candidate field block; and (c4) if at least one of said two field blocks corresponds to the field_no_update, assigning the one_field_no_update to said two field blocks.

3. The method as recited in claim 2, wherein the step (d) includes the steps of:

(d1) detecting whether BAB_type_field of the other field block is '2' or '3' to generate an all_0/all_255 signal, wherein the BAB_type_field '2' represents that an error of the other field block with respect to a first reference block is not greater than a predetermined threshold and the BAB_type_field '3' represents that an error of the other field block with respect to a second reference block is not greater than the predetermined threshold, the respective reference blocks having M×N pixels and all pixels of the first and the second reference blocks being the first and the second binary values, respectively;

(d2) setting a field_no_update signal for the other field block, wherein the field_no_update represents that the field error for the other field block is smaller than the predetermined threshold so that the other field block is replaced with a most similar candidate field block;

(d3) calculating a field motion vector difference for shape (a field MVDs) between the motion vector of the other field block and its predictor based on the field based motion estimation through the step (c1) to create a field MVD signal, wherein the field MVD signal indicates whether or not the field MVDs is zero;

(d4) encoding the field MVDs of the other field block, if the field MVDs is not zero, to generate field MVD data;

(d5) if the field error is not smaller than the predetermined threshold, producing field intra-coded data and field inter-coded data, wherein the field intra-coded data is generated by encoding the pixels of the other field block based on predetermined pixels of the current picture and the inter-coded data is provided by encoding the pixels of the other field block based on preset pixels included in the current picture and the most similar candidate field block of the other field block;

(d6) generating a field intralinter signal, wherein the field intra/inter signal is generated when either the field intra-coded data or the field inter-coded data is selected; and (d7) determining the BAB_type_field based on the all_0/all_255 signal, the field MVD signal, the field_no_update signal and/or the field intra/inter signal.

4. The method as recited in claim 3, wherein the intra-coded data is provided by an intra-context based arithmetic encoding(CAE) method and the inter-coded data is provided by an inter-CAE method.

5. The method as recited in claim 1, wherein the no_update BAB_type includes BAB_type '2' or '3',
wherein BAB_type '2' represents that an error of the target block with respect to a first reference block is not greater than a predetermined threshold and BAB_type '3' represents that an error of the target block with respect to a second reference block is not greater than the predetermined threshold, the respective reference blocks having M×N pixels and all pixels of the first and the second reference blocks being the first and the second binary values, respectively.

6. The method as recited in claim 5, wherein the no_update BAB_type further includes BAB_type '0', which represents that a motion vector difference for shape (MVDs) between a motion vector of the target block and that of its motion vector predictor is zero and an error of the target block with respect to a most similar candidate block is not greater than the predetermined threshold, wherein the most similar candidate block having M×N pixels yields a minimum error among a plurality ofr candidate blocks of one or more reference pictures of the current picture.

7. The method as recited in claim 6, wherein said BAB_type '0' is determined through the steps of:

(a1) motion estimating the target block with reference to said one or more reference pictures of the current picture to thereby generate motion vector information including the most similar candidate block and the motion vector therefor;

(a2) calculating the error between the target block and the most similar candidate block and the MVDs between the motion vector and its predictor;

(a3) comparing the MVDs and the error of the target block with zero and the predetermined threshold, respectively, (a4) if the error is not greater than the predetermined threshold, deciding the target block as no_update, wherein the no_update represents the target block is replaced with the most similar candidate block; and (a5) if the MVDs is zero and the target block corresponds to the no_update, generating said BAB_type '0'.

8. The method as recited in claim 1, wherein the method, prior to the step (e), further comprises the steps of:

(f) if the encoding_type is determined as the frame-basis in step (b), encoding the target block by employing the frame-based coding discipline to generate a BAB_type having frame-coded data, wherein the BAB_type represents a coding condition of the frame-coded data; and (g) if said two field blocks are not decided as the BAB_type of the one_field_no_update, encoding said two field blocks by using the field-based coding discipline to generate a BAB_type having field-coded data, wherein the BAB_type represents a coding condition of the field-coded data.

9. The method as recited in claim 8, wherein the BAB_type determined at the step (f) is one of BAB_types '1', '4', '5' and '6', wherein the BAB_type '1', '4', '5' and '6' are "MVDs≠0 and no_update", "intra context based arithmetic encoding" (intra_CAE), "MVDs=0 and inter context based arithmetic encoding" (inter_CAE) and "MVDs≠0 and no_update", respectively.

10. The method as recited in claim 8, wherein the BAB_type determined at step (g) is one of BAB_types' '4', '5' and '6', wherein the BAB_type '4', '5' and '6' are "intra context based arithmetic encoding" (intra_CAE), "MVDs=0 and inter context based arithmetic encoding" (inter_CAE) and "MVDs≠0 and no_update", respectively.

11. An apparatus for encoding a target block of an interlaced shape signal, wherein the interlaced shape signal includes a plurality of pictures, each picture being divided into a multiplicity of blocks of M×N pixels having one of a first and a second binary values, M and N being positive even integers, respectively, and the target block is encoded by either a frame-based coding to be encoded on an M×N pixel basis or a field-based coding to be encoded on an M/2×N pixels basis, the target block representing one of the blocks of a current picture to be encoded, the apparatus comprising:

no_update binary alpha block type (BAB_type) decision circuit for determining whether or not the target block is encoded with only no_update BAB_type, wherein the no_update BAB_type represents that the target block is encoded only by the BAB_type itself, requiring no supplemental encoded data for the target block;

encoding_type decision circuit for selecting either the frame-based or the field-based encoding_type as an encoding_type based on a degree of correlation between the target block and its two field blocks, wherein said two field blocks contain every odd row and every even row of the target block, respectively, each field block having M/2×N pixels, and the encoding_type indicates which of a frame-based coding discipline and a field-based coding discipline is used to encode the target block;

one_field_no_update decision circuit for deciding whether or not the two field blocks correspond to one_field_no_update, wherein said one_field_no_update represents that at least one of the two field blocks is replaced with a most similar candidate field block;

one_field_no_update coding circuit for finding top_or_bottom and BAB_type_field, wherein said top_or_bottom indicates which of the two field blocks is replaced with the most similar candidate field block and the BAB_type_field represents a coding condition of the other field block that is not indicated by the top_or_bottom; and multiplexor for multiplexing the non_data BAB_type, the encoding_type, the BAB_type, the top_or_bottom and/or the BAB_type_field.

12. The apparatus as recited in claim 11, wherein the one_field_no_update decision circuit includes:

means for motion-estimating each of said two field blocks with reference to one or more reference pictures of the current picture, to thereby generate a most similar candidate field block thereof;

means for calculating a field error between said each field block and the most similar candidate field block to compare the field error of said each field block with another predetermined threshold;

means for deciding said each field block to be field_no_update, wherein the field_no_update represents that said each field block is replaced with the most similar candidate field block; and means for assigning the one_field_no_update to said two field blocks.

13. The apparatus as recited in claim 12, wherein the one_field_no_update coding circuit includes:

means for detecting whether BAB_type_field of the other field block is '2' or '3' to generate an all_0/all_255 signal, wherein the BAB_type_field '2' represents that an error of the other field block with respect to a first reference block is not greater than a predetermined threshold and the BAB_type_field '3' represents that an error of the other field block with respect to a second reference block is not greater than the predetermined threshold, the respective reference blocks having M×N pixels and all pixels of the first and the second reference blocks being the first and the second binary values, respectively;

means for setting a field_no_update signal for the other field block, wherein the field_no_update represents that the field error for the other field block is smaller than the predetermined threshold so that the other field block is replaced with a most similar candidate field block;

means for calculating a field motion vector difference for shape (a field MVDs) between the motion vector of the other field block and its predictor based on the field based motion estimation to create a field MVD signal, wherein the field MVD signal indicates whether or not the field MVDs is zero;

means for encoding the field MVDs of the other field block, if the field MVDs is not zero, to generate field MVD data;

means for producing field intra-coded data and field inter-coded data, wherein the field intra-coded data is generated by encoding the pixels of the other field block based on predetermined pixels of the current picture and the inter-coded data is provided by encoding the pixels of the other field block based on preset pixels included in the current picture and the most similar candidate field block of the other field block;

means for generating a field intra/inter signal, wherein the field intra/inter signal is generated when either the field intra-coded data or the field inter-coded data is selected; and means for determining the BAB_type_field based on the all_0/all_255 signal, the field MVD signal, the field_no_update signal and/or the field intra/inter signal.

14. The apparatus as recited in claim 13, wherein the intra-coded data is provided by an intra-context based arithmetic encoding(CAE) method and the inter-coded data is provided by an inter-CAE method.

15. The apparatus as recited in claim 11, wherein the no_update BAB_type includes BAB_type '2' or '3', wherein BAB_type '2' represents that an error of the target block with respect to a first reference block is not greater than a predetermined threshold and BAB_type '3' represents that an error of the target block with respect to a second reference block is not greater than the predetermined threshold, the respective reference blocks having M×N pixels and all pixels of the first and the second reference blocks being the first and the second binary values, respectively.

16. The apparatus as recited in claim 15, wherein the no_update BAB_type further includes BAB_type '0', which represents that a motion vector difference for shape (MVDs) between a motion vector of the target block and that of its motion vector predictor is zero and an error of the target: block with respect to a most similar candidate block is not greater than the predetermined threshold, wherein the most similar candidate block having M×N pixels yields a minimum error among a plurality of candidate blocks of one or more reference pictures of the current picture.

17. The apparatus as recited in claim 16, wherein said BAB_type '0' is determined by:

means for motion-estimating the target block with reference to said one or more reference pictures of the current picture to thereby generate motion vector information including the most similar candidate block and the motion vector therefor;

means for calculating the error between the target block and the most similar candidate block and the MVDs between the motion vector and its predictor; and means for comparing the MVDs and the error of the target block with zero and the predetermined threshold, respectively, means for deciding the target block as no_update, wherein the no_update represents the target block is replaced with the most similar candidate block.

18. The apparatus as recited in claim 11 further comprising:

frame based coding circuit for encoding the target block by employing the frame-based coding discipline to generate a BAB_type having frame-coded data, wherein the BAB_type represents a coding condition of the frame-coded data; and field based coding circuit for encoding said two field blocks by using the field-based coding discipline to generate a BAB_type having field-coded data, wherein the BAB_type represents a coding condition of the field-coded data.

19. The apparatus as recited in claim 18, wherein the frame based coding circuit determines one of BAB_types '1', '4', '5' and '6' as a BAB_type of the target block, wherein the BAB_type '1', '4', '5' and '6' are "MVDs≠0 and no_update", "intra context based arithmetic encoding (intra_CAE)", "MVDs=0 and inter context based arithmetic encoding (inter_CAE)" and "MVDs≠0 and no_update", respectively.

20. The apparatus as recited in claim 18, wherein the field based coding circuit determines one of BAB_types '4', '5' and '6' as a BAB_type of the two field blocks, wherein the BAB_type '4', '5' and '6' are "intra context based arithmetic encoding (intra_CAE)", "MVDs=0 and inter context based arithmetic encoding (inter_CAE)" and "MVDs≠0 and no_update", respectively.

* * * * *